US007782484B2

(12) United States Patent
Aihara

(10) Patent No.: US 7,782,484 B2

(45) Date of Patent: Aug. 24, 2010

(54) IMAGE PROCESSING APPARATUS, IMAGE PROCESSING METHOD, AND RECORDING MEDIUM STORING PROGRAM PRODUCT FOR CAUSING COMPUTER TO FUNCTION AS IMAGE PROCESSING APPARATUS

(75) Inventor: Nobuhiro Aihara, Osaka (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1129 days.

(21) Appl. No.: 11/362,042

(22) Filed: Feb. 27, 2006

(65) Prior Publication Data

US 2007/0121168 A1 May 31, 2007

(30) Foreign Application Priority Data

Nov. 30, 2005 (JP) ............................ 2005-345445

(51) Int. Cl.
*H04N 1/60* (2006.01)

(52) U.S. Cl. ........................ 358/1.9; 358/3.21; 358/450

(58) Field of Classification Search .................. 358/1.1, 358/1.9, 1.13–1.15, 3.21; 345/519, 536; 399/194

See application file for complete search history.

(56) References Cited

U.S. PATENT DOCUMENTS

| | | | | |
|---|---|---|---|---|
| 5,473,748 | A * | 12/1995 | Date et al. | 345/536 |
| 6,643,189 | B2 * | 11/2003 | Kimura et al. | 365/189.04 |
| 6,731,400 | B1 * | 5/2004 | Nakamura et al. | 358/1.9 |
| 6,768,559 | B1 * | 7/2004 | Kuwata et al. | 358/1.9 |
| 6,917,446 | B2 * | 7/2005 | Tanaka et al. | 358/1.9 |
| 7,257,352 | B2 * | 8/2007 | Yamada et al. | 399/194 |
| 7,344,225 | B2 * | 3/2008 | Nakajo | 347/41 |
| 7,349,114 | B2 * | 3/2008 | Otsuka | 358/1.15 |
| 7,692,813 | B2 * | 4/2010 | Ohta et al. | 358/1.18 |
| 7,692,831 | B2 * | 4/2010 | Nishikawa | 358/518 |
| 2005/0280847 | A1 * | 12/2005 | Cairns et al. | 358/1.9 |

FOREIGN PATENT DOCUMENTS

| | | |
|---|---|---|
| JP | 06-175342 | 6/1994 |
| JP | 2002-259011 | 9/2002 |

OTHER PUBLICATIONS

Notice of Grounds of Rejection in JP 2005-345445 dated Jun. 9, 2009, and an English Translation thereof.

* cited by examiner

*Primary Examiner*—Mark K Zimmerman
*Assistant Examiner*—Dung D Tran
(74) *Attorney, Agent, or Firm*—Buchanan Ingersoll & Rooney PC

(57) ABSTRACT

An image processing apparatus allowing efficient trapping/overprint is provided. A CPU of a printer serving as the image processing apparatus includes an object extraction unit extracting a component image from image data, a pair extraction unit extracting a pair from a plurality of objects, a calculation unit calculating an overlapping print amount for each of primary colors of color materials of each component image, a rule storing unit storing a plurality of process contents and rules for executing processing, a process content storing unit storing the process contents, a judgment unit judging whether or not a pair of the image components satisfies the rule associated with a priority, and an execution unit for executing the processing of trapping or overprint.

30 Claims, 8 Drawing Sheets

| No. (400) | PRIORITY (410) | PROCESS CONDITION (420) | PROCESS CONTENT (430) |
|---|---|---|---|
| 1 | 1 | [RELATION OF IMAGE COMPONENTS] OVERLAPPING PRINT AMOUNT OF CMYK BETWEEN IMAGE COMPONENTS IS EQUAL TO OR GREATER THAN THRESHOLD VALUE. | NO PROCESSING IS APPLIED. |
| 2 | 2 | [FIRST IMAGE COMPONENT] GRAPHICS [SECOND IMAGE COMPONENT] BLACK CHARACTER | OVERPRINT PROCESS ON FIRST IMAGE COMPONENT |
| 3 | 3 | [FIRST IMAGE COMPONENT] GRAPHICS [SECOND IMAGE COMONENT] CHARACTER | TRAPPING PROCESS ON FIRST IMAGE COMPONENT |
| 4 | 4 | [FIRST IMAGE COMPONENT] GRAPHICS [SECOND IMAGE COMONENT] GRAPHICS [RELATION OF IMAGE COMPONENTS] BRIGHTNESS OF FIRST IMAGE COMPONENT = BRIGHTNESS OF SECOND IMAGE COMPONENT | TRAPPING PROCESS ON FIRST IMAGE COMPONENT AND SECOND IMAGE COMPONENT IN HALF |
| 5 | 5 | [FIRST IMAGE COMPONENT] GRAPHICS [SECOND IMAGE COMONENT] GRAPHICS [RELATION OF IMAGE COMPONENTS] BRIGHTNESS OF FIRST IMAGE COMPONENT > BRIGHTNESS OF SECOND IMAGE COMPONENT | TRAPPING PROCESS ON FIRST IMAGE COMPONENT |

IMAGE PROCESSING APPARATUS, IMAGE PROCESSING METHOD, AND RECORDING MEDIUM STORING PROGRAM PRODUCT FOR CAUSING COMPUTER TO FUNCTION AS IMAGE PROCESSING APPARATUS

This application is based on Japanese Patent Application No. 2005-345445 filed with the Japan Patent Office on Nov. 30, 2005, the entire content of which is hereby incorporated by reference.

BACKGROUND OF THE INVENTION

1. Field of the Invention

The present invention relates to control on an image processing apparatus. More particularly, the present invention relates to an image processing apparatus capable of controlling execution of image adjustment processing for adjusting an image having a plurality of colors, an image processing method, and a recording medium storing a program product for causing a computer to function as the image processing apparatus.

2. Description of the Related Art

Image adjustment processing such as trapping or overprint has been known as an approach for preventing image degradation resulting from displacement of process colors (for example, C, M, Y and K) in an image output at the boundary portions of a plurality of image components such as characters, graphics, and pictures included in an image subjected to image adjustment processing. In order to prevent white patches caused by color displacement at the boundary portions of the image components, trapping allows the boundary portions of image components to slightly overlap with each other, and overprint allows an adjacent color to be laid under the color of a target image component. An apparatus has been known that automatically performs the processing such as trapping or overprint according to the preset process conditions (rules).

For example, Japanese Laid-Open Patent Publication No. 06-175342 relates to a setting of plate making designation information and discloses a technique for stabilizing precision with improved efficiency. According to this technique, in order to decide a process content, a rule base having a plurality of process conditions registered therein is accessed several times so that it is determined for each process condition whether or not target image components satisfy their respective process conditions. Multiple pieces of prospective plate making designation information that satisfy the process condition are obtained, and the final process content is thereafter decided based on the priority corresponding to the type of processing.

SUMMARY OF THE INVENTION

According to the aforementioned technique, however, the final process content is decided only after obtaining multiple pieces of prospective plate making designation information that satisfy the process condition, so that determinations need to be made one-by-one for the prepared rule base. Therefore, the process time for determination increases with the number of process conditions, thereby possibly degrading the processing efficiency.

The present invention is made to solve the aforementioned problem. An object of the present invention is to provide an image processing apparatus capable of making an efficient judgment of process conditions concerning image adjustment processing.

Another object of the present invention is to provide an image processing method for allowing an efficient judgment of process conditions concerning image adjustment processing.

A further object of the present invention is to provide a recording medium storing a program product for causing a computer to function as an image processing apparatus capable of making an efficient judgment of process conditions concerning image adjustment processing.

In summary, in order to solve the aforementioned problem, in accordance with an aspect of the present invention, an image processing apparatus is provided that performs image adjustment processing on an image including a plurality of image components having information at least about a color as an attribute. The image processing apparatus includes: a first storage unit storing a process content of the image adjustment processing in association with a process condition for deciding which image adjustment processing is performed; a determination unit determining whether or not the attribute of the image component satisfies the process condition; a second storage unit storing a priority of each process condition indicating an order of determination made by the determination unit; and a processing unit successively determining whether or not the attribute of the image component satisfies the process condition based on the priority and executing on the image component the image adjustment processing corresponding to the process condition first determined to be satisfied.

Preferably, the determination unit determines whether or not one of one image component and two image components satisfies the process condition associated with the priority.

Preferably, a highest priority in the priorities is associated with the process condition for not performing any of the image adjustment processing.

Preferably, the image processing apparatus includes: a process condition input unit receiving an input of the process condition; a priority input unit receiving an input of the priority; and an association unit associating the received priority with each process condition.

Preferably, the image processing apparatus further includes a decision unit for deciding each priority. The decision unit sets a priority of the process condition for not performing the image adjustment processing higher than a priority of the process condition for performing the image adjustment processing.

Preferably, the image processing apparatus further includes a decision unit for deciding each priority. When two process conditions are in an inclusion relation, the decision unit sets a priority of the including process condition higher than a priority of the included process condition.

Preferably, the image processing apparatus further includes: an image data input unit receiving an input of the image data; a decision unit for deciding each priority based on the received image data; and an association unit associating each decided priority with each process condition.

In accordance with another aspect of the present invention, an image processing method is provided for performing image adjustment processing on an image including a plurality of image components having information at least about a color as an attribute. The image processing method includes the steps of preparing a process content of the image adjustment processing in association with a process condition for deciding which image adjustment processing is performed; determining whether or not the attribute of the image component satisfies the process condition; preparing a priority of each process condition indicating an order of determination made at the step of determining; and successively determining whether or not the attribute of the image component satisfies the process condition based on the priority and executing on the image component the image adjustment processing corresponding to the process condition first determined to be satisfied.

Preferably, at the step of determining whether or not each image component satisfies the process condition associated with the priority, it is determined whether or not one of one image component and two image components satisfies the process condition associated with the priority.

Preferably, a highest priority in the priorities is associated with the process condition for not performing any of the image adjustment processing.

Preferably, the image processing method further includes the steps of: receiving an input of the process condition; receiving an input of each priority; and associating each received priority with each process condition.

Preferably, the image processing method further includes the step of deciding each priority. At the step of deciding each priority, a priority of the process condition for not performing the image adjustment processing is set higher than a priority of the process condition for performing the image adjustment processing.

Preferably, the image processing method further includes the step of deciding each priority. At the step of deciding each priority, when two process conditions are in an inclusion relation, a priority of the including process condition is set higher than a priority of the included process condition.

Preferably, the image processing method further includes the steps of: receiving an input of the image data; deciding each priority based on the received image data; and associating each decided priority with each process condition.

In accordance with a further aspect of the present invention, a recording medium is provided that stores a program product for causing a computer to function as an image processing apparatus performing image adjustment processing on an image including a plurality of image components having information at least about a color as an attribute. The program product causes the computer to execute the steps of: preparing a process content of the image adjustment processing in association with a process condition for deciding which image adjustment processing is performed; determining whether or not the attribute of the image component satisfies the process condition; preparing a priority of each process condition indicating an order of determination made at the step of determining; and successively determining whether or not the attribute of the image component satisfies the process condition based on the priority and executing on the image component the image adjustment processing corresponding to the process condition first determined to be satisfied.

Preferably, at the step of determining whether or not each image component satisfies the process condition associated with the priority, it is determined whether or not one of one image component and two image components satisfies the process condition associated with the priority.

Preferably, a highest priority in the priorities is associated with the process condition for not performing any of the image adjustment processing.

Preferably, the program product causes the computer to further execute the steps of: receiving an input of the process condition; receiving an input of each priority; and associating each received priority with each process condition.

Preferably, the program product causes the computer to further execute the step of deciding each priority. At the step of deciding each priority, a priority of the process condition for not performing the image adjustment processing is set higher than a priority of the process condition for performing the image adjustment processing.

Preferably, the program product causes the computer to further execute the step of deciding each priority. At the step of deciding each priority, when two process conditions are in an inclusion relation, a priority of the including process condition is set higher than a priority of the included process condition.

Preferably, the program product causes the computer to further execute the steps of: receiving an input of the image data; deciding each priority based on the input image data; and associating each decided priority with each process condition.

In the image processing apparatus in accordance with the present invention, the process conditions are determined in order based on the priorities, and the process content corresponding to the process condition first determined to be satisfied is executed, so that necessary image processing can be executed quickly without any judgment on a condition excluded from image processing.

In the image processing method in accordance with the present invention, the process conditions are determined in order based on the priorities, and the process content corresponding to the process condition first determined to be satisfied is executed, so that no judgment is made on a condition excluded from image processing, resulting in efficient image processing.

In the recording medium storing the program product in accordance with the present invention, a computer can function as an image processing apparatus capable of quickly executing necessary image processing without any judgment on a condition excluded from image processing, in which the process conditions are determined in order based on the priorities, and the process content corresponding to the process condition first determined to be satisfied is executed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram illustrating exemplary storage of data in a process condition storing unit 322 included in an image data generating unit 200.

DESCRIPTION OF THE PREFERRED EMBODIMENTS

Figure 1:
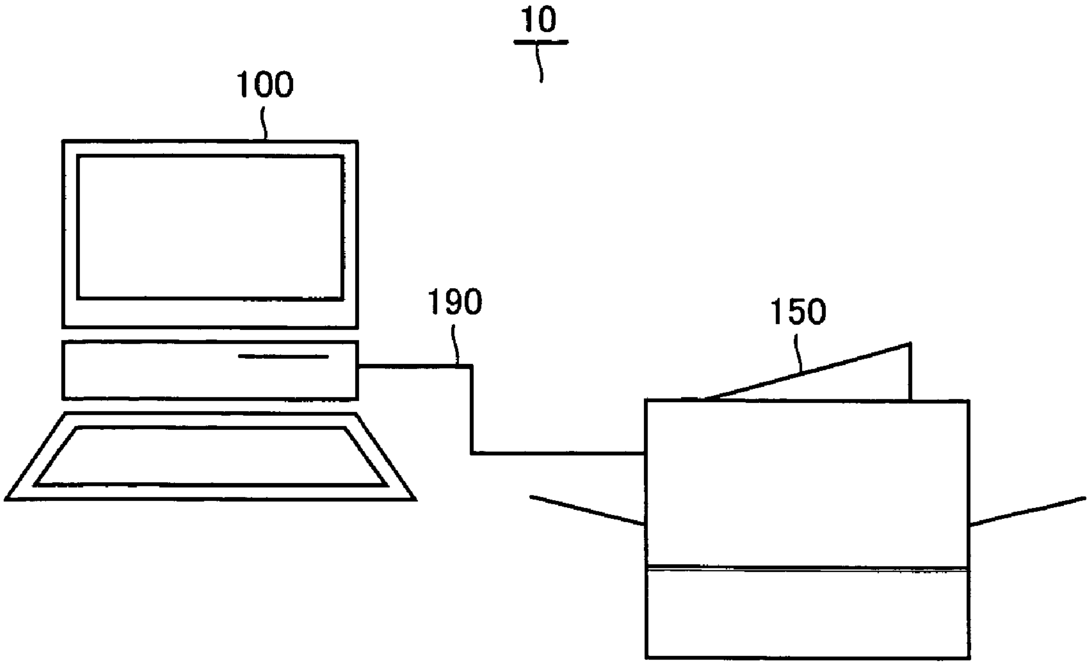
FIG. 1 is a diagram illustrating a configuration of an image processing system 10 in accordance with an embodiment of the present invention.

In the following, the embodiments of the present invention will be described with reference to the figures. In the following description, the same parts will be denoted with the same reference characters. Their designations and functions are also the same. Therefore the detail description thereof will not be repeated.

Referring to FIG. 1, an image processing system 10 in accordance with an embodiment of the present invention will be described. Image processing system 10 includes an image processing apparatus 100 and a printer 150. Image processing apparatus 100 and printer 150 are connected to each other through a cable 190. Image processing apparatus 100 generates an image based on input instructions and data from outside. Printer 150 forms an image on paper according to input data from outside and ejects the paper.

It is noted that printer 150 is described here as an apparatus for realizing a technical idea in accordance with the present invention. When the idea is realized by software, printer 150 includes, as described later, a storage unit storing the software and a processor for executing the software. Alternatively, the idea may be realized by hardware. In this case, printer 150 is realized by a combination of circuit elements for realizing the processes in accordance with the idea or any other hardware.

However, the application of the technical idea is not limited to printer 150. The idea may also be realized in image processing apparatus 100. More specifically, when an ordinary printing device is used in place of printer 150, image processing apparatus 100 may execute the process as described later on image data and send the processed data to the printer. In this case, image processing apparatus 100 is realized, for example, by PC (Personal Computer), PDA (Personal Digital Assistant), or any other device having an operation processing function.

Figure 2:
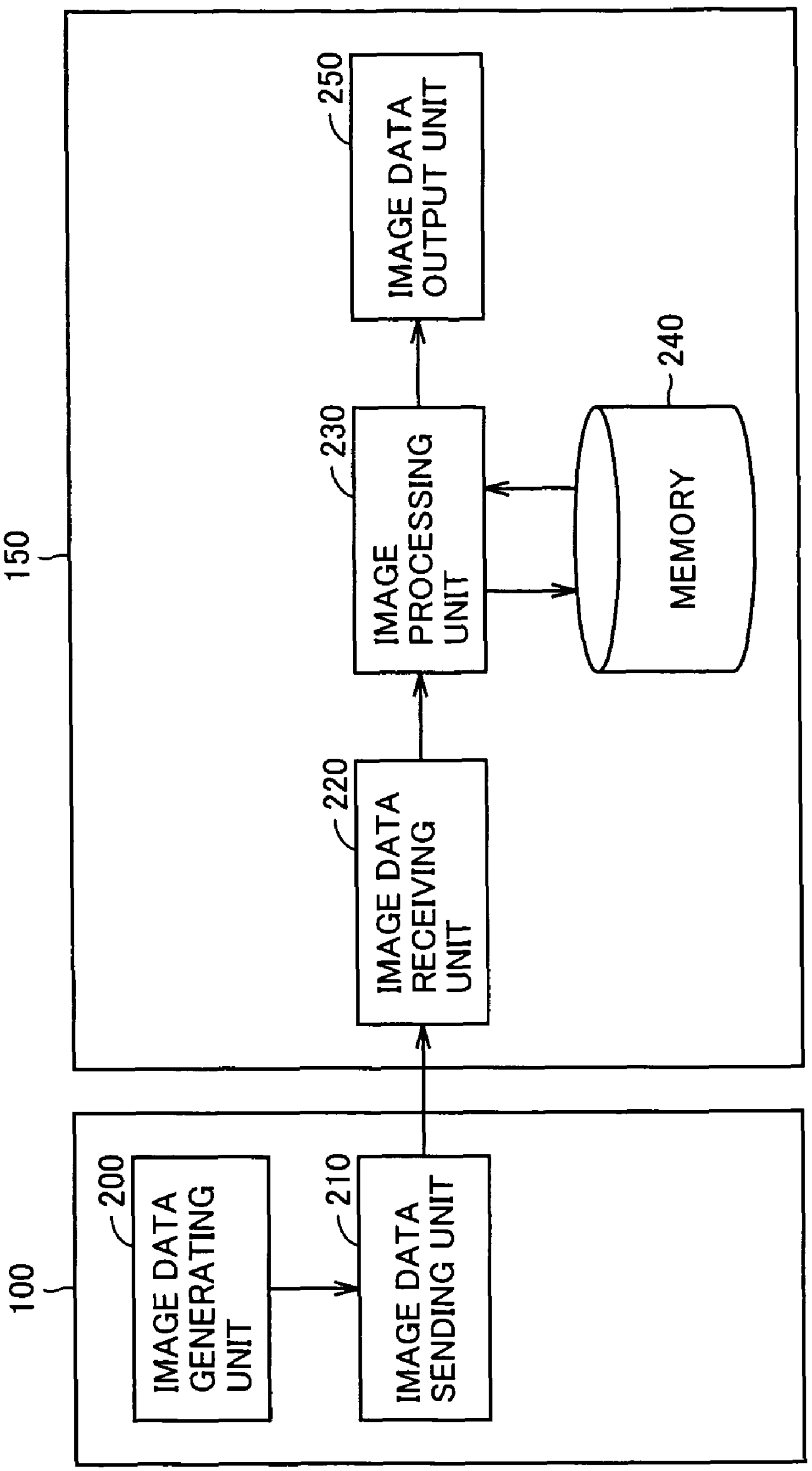
FIG. 2 is a block diagram illustrating a functional configuration of an image processing apparatus 100 and a printer 150.

Referring to FIG. 2, the configuration of image processing system 10 will be described in detail.

Image processing apparatus 100 includes an image data generating unit 200 receiving an input of data from outside and generating image data based on the data, and an image data sending unit 210 for sending the data generated by image data generating unit 200 to printer 150. When image processing apparatus 100 is realized by PC, image data generating unit 200 is realized by a processor included in the PC. Image data sending unit 210 is realized by a parallel interface or the like.

Printer 150 includes an image data receiving unit 220 receiving image data sent by image data sending unit 210 through cable 190, a CPU (Central Processing Unit) 230 for executing a process of forming an image based on the received data, a memory 240 storing data, and an image data output unit 250 forming image data on paper based on the data processed by CPU 230.

Image data receiving unit 220 includes a parallel interface or any other interface. Memory 240 includes a memory storing control data for defining an operation of printer 150 in a nonvolatile manner, and a memory storing image data sent to image processing apparatus 100. The control data is stored, for example, in a flash memory, an ROM (Read Only Memory), or the like. The image data is temporarily stored, for example, in an RAM (Random Access Memory). Alternatively, when printer 150 has a buffer function for image data, the image data may be stored in a volatile RAM.

Image data output unit 250 includes a unit for performing a printing function. Specifically, image data output unit 250 includes an image formation unit forming an image on paper based on data from CPU 230, a paper-feeding unit supplying paper to the image formation unit, and an ejection unit ejecting the paper having an image formed thereon from the image formation unit. It is noted that the image formation function in printer 150 can readily be understood by those skilled in the art. Therefore, the detailed description thereof will not be repeated here.

Figure 3:
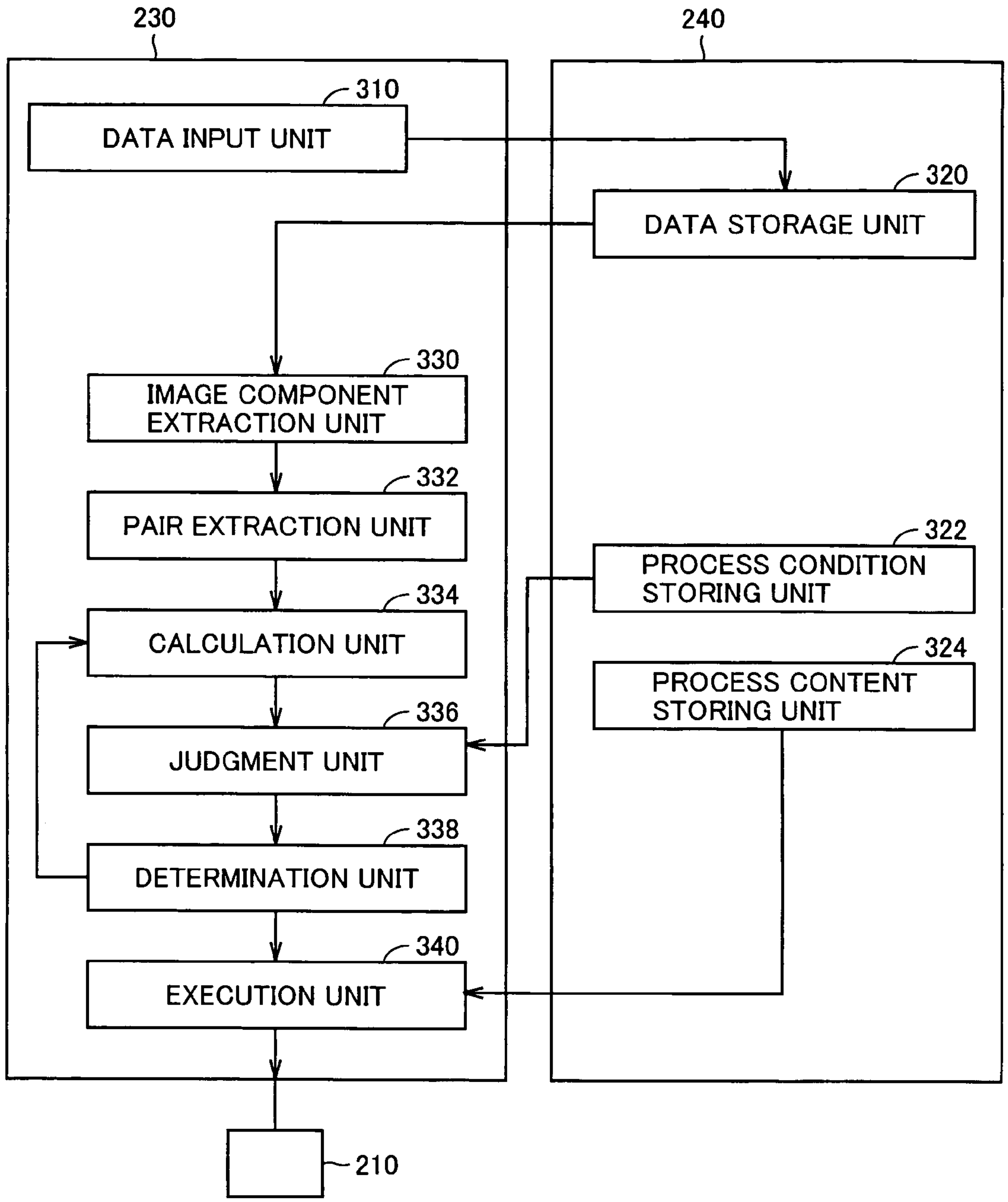
FIG. 3 is a block diagram illustrating a functional configuration of a CPU 230 included in printer 150.

Referring to FIG. 3, CPU 230 and memory 240 for causing printer 150 to function as the image processing apparatus in accordance with the present invention will be described. FIG. 3 is a block diagram illustrating the configuration of the function realized by CPU 230 and memory 240.

First, memory 240 includes a data storage unit 320 storing data received by CPU 230, a process condition storing unit 322 storing the contents of a plurality of processes prepared beforehand for adjusting an image having a plurality of colors and process conditions for deciding whether or not each processing is to be executed, and a process content storing unit 324 storing the contents of the processing.

CPU 230 includes a data input unit 310 receiving an input of data from outside, an image component extraction unit 330 for extracting, from image data stored in data storage unit 320, an image component that is included in the image data, a pair extraction unit 332 extracting a pair of image components among a plurality of image components, and a calculation unit 334 calculating an overlapping print amount for each of primary colors, which are color materials for each image component, based on the amount of information of a color, which is one of attributes for each of the image components of the pair extracted by pair extraction unit 332. It is noted that in addition to primary colors, that is C (cyan), M (magenta) and Y (yellow), K (black) may be used.

Here, "overlapping print amount" represents a degree of overlapping of the amounts of information of color materials for the extracted two image components. The smaller amount of information between those amounts of information is used as the degree of overlapping.

For example, as for the amounts of information of four colors (C, M, Y, K), it is assumed that the amount of information of the first image component is (50, 100, 150, 200) and that of the second image component is (20, 0, 70, 250). In this case, the overlapping print amount for cyan is "20" from min {50, 20}. The overlapping print amount for magenta is "0" from min {100, 0}. The overlapping print amount for yellow is "70" from min {150, 70}. The overlapping print amount for black is "200" from min {200, 250}. In this case, if the overlapping print amount in the four colors is "0", and if "displacement" takes place in the printing of any color, no ink is applied in the portion of the displacement, thereby degrading the quality of the printing.

CPU 230 further includes a judgment unit 336 judging whether or not a pair of image components satisfies a process condition based on the process conditions stored in process condition storing unit 322 and the process contents stored in process content storing unit 324, a determination unit 338 determining whether or not the process ends for all the pairs, and an execution unit 340 for executing image adjustment processing by applying the content of each processing based on a result of the determination made on all the pairs. When execution unit 340 executes the processing, data for image formation is sent to image data output unit 250. Image data output unit 250 forms an image on paper based on the data and ejects the paper.

Referring to FIG. 4, the data structure of process condition storing unit 322 will be described. FIG. 4 is a diagram illustrating exemplary storage of data in process condition storing unit 322 in memory 240. Process condition storing unit 322 includes region 400-region 430 for storing data.

Numbers that identify the conditions for executing image processing are stored in region 400. Priorities for defining the order in which image adjustment processing (for example, trapping, overprint, edge processing) for adjusting an image having a plurality of image components is executed are stored in region 410. The process condition corresponding to each priority is stored in region 420. Here, the process condition represents, based on the extracted image components (for example, graphics, characters, or the like), the combination or magnitude relation of their attributes (types such as graphics, characters, and photographs, the printing amount for each CMYK, color information such as brightness and chroma calculated from each printing amount, or the size such as width, height, and the number of pixels).

The process content associated with each priority is stored in region 430. Here, "process content" refers to data for defining specifically which processing is performed or is not performed on an image component that is to be determined as to whether or not a processing is performed.

For example, it is defined for the priority "1" that neither overprint nor trapping is applied when the overlapping print amount for CYMK between image components is equal to or greater than a predetermined threshold value. In other words, the priority "1" is associated with the process condition described above as the highest priority. The process condition is set for the priority "1" such that the image adjustment processing is not performed, thereby efficiently decreasing the number of condition judgments.

The process condition set with the priority "2" is satisfied and the process content corresponding to that process condition is applied, when one of the image components is graphic and the other image component is a black character. In this case, it is defined that the overprint process is applied to the first image component (that is, graphics). Similarly, the process conditions are associated with the respective process contents for the priorities "3" to "5".

In the process condition set with the priority "2", one image component is graphics and the other image component is a black character. When the image components are graphics and a black character, it is uniquely decided as a process content that overprint is performed on the graphics. Therefore, here, the priority is set higher than the other process conditions.

In the process condition set with the priority "3", one image component is graphics and the other image component is a character. If an image component is a character, generally it is often a black character. Therefore, the priorities are set in the order of "2", "3". If the priorities are set otherwise, the condition that "one image component is graphics and the other image component is a character" is satisfied even when the character is a black character. Accordingly, inconveniently a trapping process is performed as a process content rather than an overprint process.

In the process conditions set with the priorities "4" and "5", both the image components are graphics, so that a process content is decided based on the relation between those two target image components. In other words, since a process content cannot be decided only based on the type of image components, the priorities are set lower than "2" and "3". In the priority "4", the relation between the image components is such that "the brightness of the first image component=the brightness of the second image component". In the priority "5", the relation between the image components is such that "the brightness of the first image component>the brightness of the second image component". On comparison, the process condition is more restrictive in the priority "4" than in the priority "5". In other words, when the brightness of the first image component is equal to that of the second image component, the condition is stricter and the process condition is more restrictive, as compared with when the brightness is not equal to each other. Therefore, the priority is set higher.

It is noted that in FIG. 4 the priorities are set in the order of the numbers of the conditions for the sake of brevity. However, the priority order may not be the same with the number of the condition.

Figure 5:
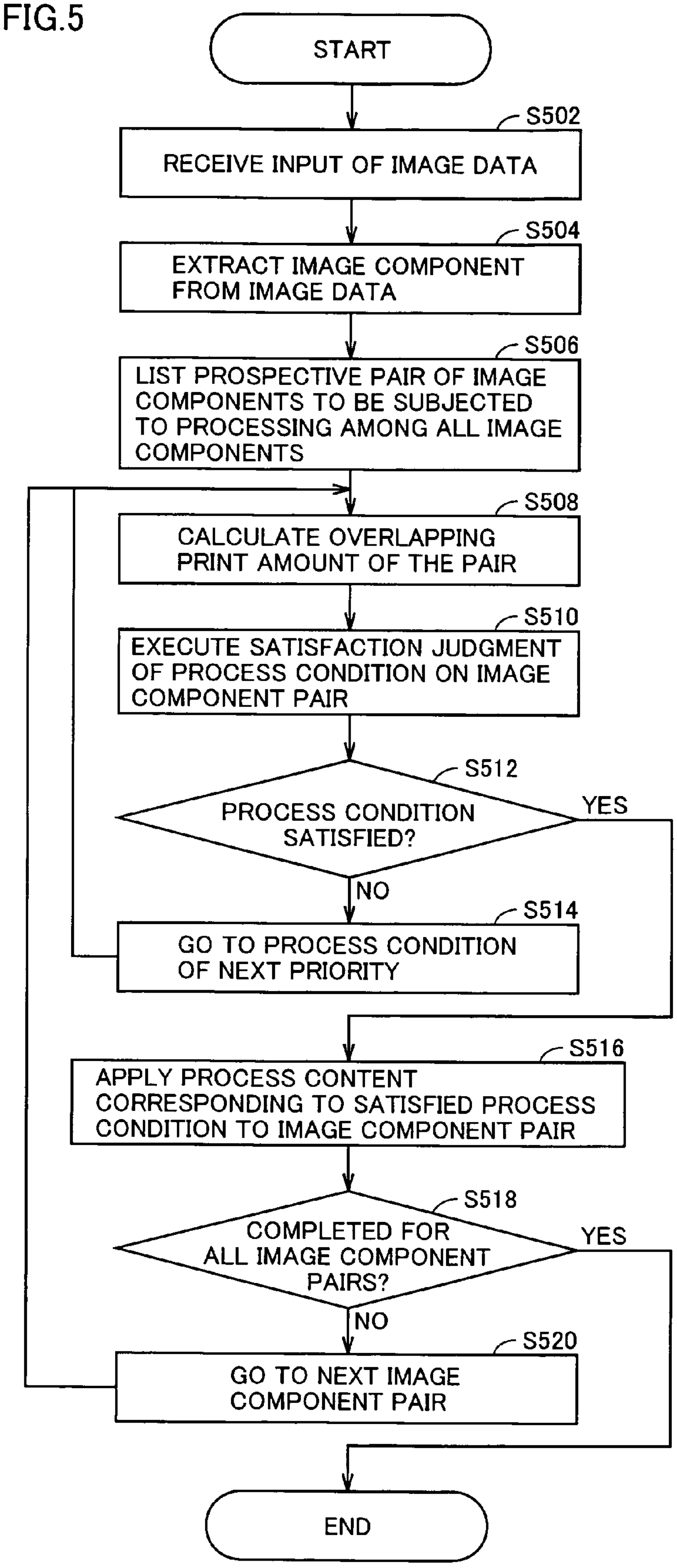
FIG. 5 is a flowchart illustrating the procedure of a process executed by CPU 230 of printer 150.

Referring to FIG. 5, the control structure of printer 150 in accordance with the embodiment will be described. The process shown in FIG. 5 is performed when image data output from image processing apparatus 100 is input to printer 150.

At step S502, CPU 230 of printer 150 receives an input of image data. At step S504, CPU 230 extracts an image component from the image data. The method of extracting an image component may employ a known image processing technique or may use image components described in PDL (Page Description Language) or the like. At step S506, CPU 230 lists a prospective pair of image components to be subjected to the processing among all the image components. This listing may be performed, for example, by assigning numbers to all the image components for respectively identifying the components and exhaustively generating combinations of the numbers.

At step S508, CPU 230 calculates an overlapping print amount of the listed image component pair. At step S510, CPU 230 executes a satisfaction judgment of a process condition on a image component pair. Specifically, this process is performed based on the data shown in FIG. 4.

At step S512, CPU 230 determines whether or not the image component pair satisfies the process condition. If the image component pair satisfies the process condition (YES at step S512), the process moves on to step S516. If not (NO at step S512), the process moves on to step S514. At step S514, CPU 230 moves to the process condition of the next priority, and each process (S508-S512) as described above is repeated.

At step S516, CPU 230 applies the process content corresponding to the satisfied process condition and executes the processing. At step S518, CPU 230 determines whether or not the process is completed for all the image component pairs. This determination is made by providing information (for example a flag) representing that the process is completed and detecting that information. If the process is completed for all the image component pairs (YES at step S518), the process ends. If not (NO at step S518), the process moves on to step S520. At step S520, CPU 230 goes to the next image component pair. Thereafter, the process returns to step S508.

With the process as described above, even when a plurality of process conditions are provided, the loop is exited at the process condition initially satisfied by each image component pair, so that the processing is applied. Therefore, the process content is efficiently decided for all the image component pairs.

It is noted that the process described above may be selectively executed when image data is input. For example, CPU 230 may execute the process only when data for enabling the process is retained in memory 240. In this manner, a printing status is a normal status, so that it can readily be determined whether or not printer 150 operates normally.

In the foregoing description, printer 150 in accordance with the present embodiment holds the priorities preset to indicate the order of judgment as to whether or not the processing is suitable for each processing of the image adjustment processing. When an instruction to form an image and image data is input to printer 150, printer 150 extracts image components from the image data and generates a pair of image components. Printer 150 decides the processing applied to each pair. In this way, printer 150 can decide the processing in the descending order of priorities of the processing, so that image formation processing can be performed at high speed.

The process as described above may be realized by PC or any computer system other than printer 150.

Now, referring to FIG. 6, a computer system 600 realizing image processing apparatus 100 in the present embodiment will be described.

Computer system 600 includes a CPU 610, a mouse 620 and a keyboard 630 for receiving an input of an instruction or data, an RAM 640 temporarily storing input data or data generated through a process executed according to a program, a hard disk 650 capable of storing data in a nonvolatile manner, a CD (Compact Disk)-ROM drive 660, a monitor 680, and a communication IF (Interface) 690, which are connected to each other through data buses. A CD-ROM 662 as a data recording medium can be inserted in CD-ROM drive 660.

The process in computer system 600 functioning as image processing apparatus 100 is realized by software executed by CPU 610 or hardware operating in response to the execution of software. Such software may be stored in RAM 640 or hard disk 650 beforehand or may be stored in CD-ROM 662 or any other data recording medium and distributed as a program product. The data stored in the data recording medium is read from the data recording medium by CD-ROM drive 660 or any other reader and then stored in hard disk 650. The software is read from RAM 640 or hard disk 650 and executed by CPU 610.

Specifically, when the program product in accordance with the present invention is read and executed in computer system 600, the computer system executes the aforementioned judgment process on the image component included in the input image data and executes image processing according to the judgment result.

Figure 6:
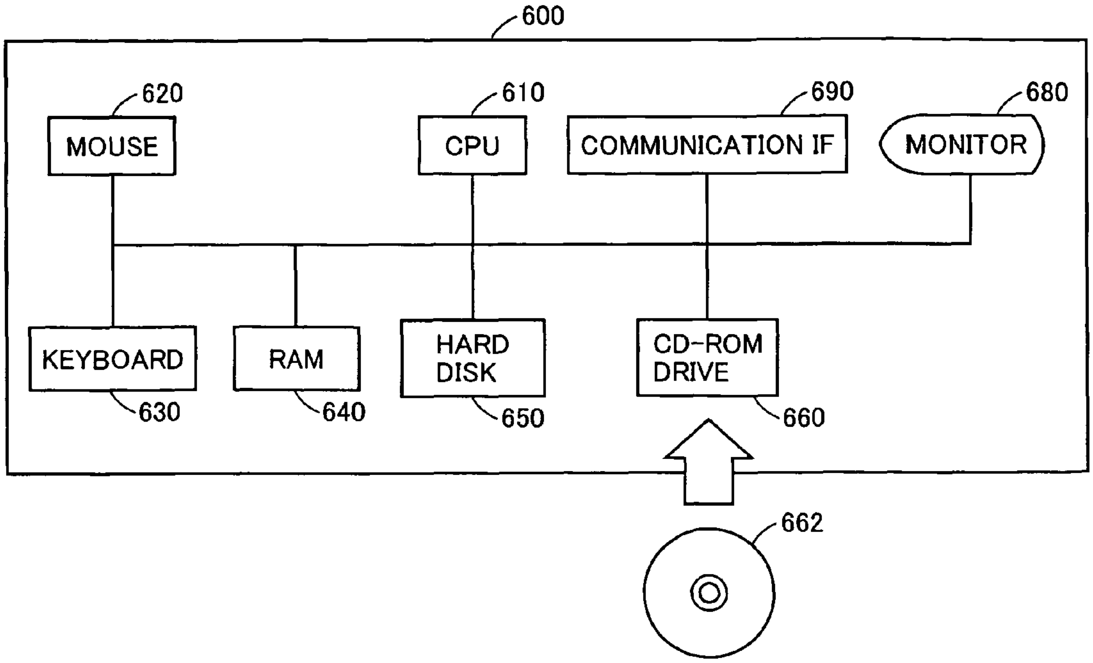
FIG. 6 is a block diagram illustrating a hardware configuration of a computer system 600 realizing image processing apparatus 100 in accordance with the embodiment.

The hardware of computer system 600 shown in FIG. 6 is general per se. Therefore, the essential part of the present invention may consist in the software stored in RAM 640, hard disk 650, CD-ROM 662, or any other recording medium. It is noted that the operation of each hardware in computer system 600 is well known and thus the detailed description will not be repeated.

<First Modification>

In the following, a modified embodiment of the present invention will be described. In the embodiment described above, priorities are used as preset data and the determination as to whether or not each processing is executed is made based on the priorities. In place of such a scheme, a determination as to whether or not the processing of trapping or overprint is executed may be made based on the calculated priorities. In this case, priorities are calculated according to an attribute of image data, for example, the color of an image.

It is noted that the printer in accordance with the modified embodiment has the same hardware configuration with the printer in accordance with the foregoing embodiment. The functions are also the same except those described below. Therefore, the detailed description thereof will not be repeated here.

Figure 7:
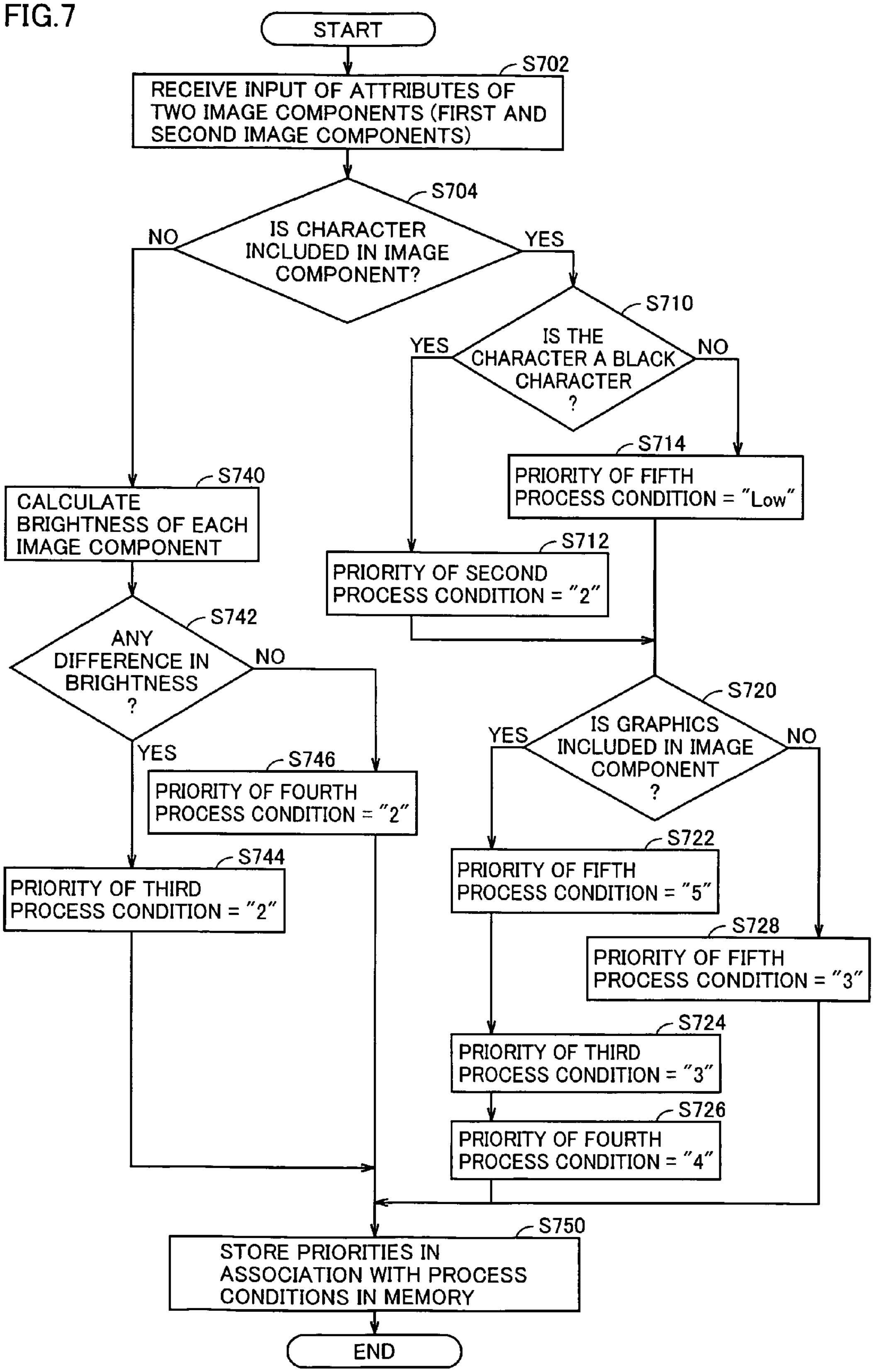
FIG. 7 is a flowchart illustrating the procedure of a process executed by CPU 230 of printer 150 in accordance with a modified embodiment of the present invention.

Referring to FIG. 7, the control structure of printer 150 in accordance with the modified embodiment will be described. FIG. 7 is a flowchart illustrating the procedure of the process executed by CPU 230. The process conditions for calculating priorities will be described, taking No. 2 to No. 5 shown in FIG. 4 as an example. The process condition of No. 1 is excluded from the following description since its priority is always “1”.

At step S702, image data generating unit 200 receives an input of the attributes of two image components (the first and second image components). At step S704, image data generating unit 200 determines whether or not a character is included in the input image components. If a character is included (YES at step S704), the process moves on to step S710. If not (NO at step S704), the process moves on to step S740.

At step S710, image data generating unit 200 determines whether or not the character is a black character. If the character is a black character (YES at step S710), the process moves on to step S712. If not (NO at step S710), the process moves on to step S714.

At step S712, image data generating unit 200 sets the priority of the second process condition to “2”. At step S714, image data generating unit 200 sets the priority of the fifth process condition to “Low”. At step S720, image data generating unit 200 determines whether or not graphics is included in the input image component. If graphics is included (YES at step S720), the process moves on to step S722. If not (NO at step S720), the process moves on to step S728.

At step S722, image data generating unit 200 sets the priority of the fifth process condition to “5”. At step S724, image data generating unit 200 sets the priority of the third process condition to “3”. At step S726, image data generating unit 200 sets the priority of the fourth process condition to “4”. At step S728, image data generating unit 200 sets the priority of the fifth process condition to “3”.

At step S740, image data generating unit 200 calculates the brightness of each image component. At step S742, image data generating unit 200 determines whether or not there is any difference in brightness. If there is a difference (YES at step S742), the process moves on to step S744. If not (NO at step S742), the process moves on to step S746.

At step S744, image data generating unit 200 sets the priority of the third process condition to “2”. At step S746, image data generating unit 200 sets the priority of the fourth process condition to “2”. At step S750, image data generating unit 200 stores the priorities in association with the process conditions in process condition storing unit 322.

As described above, in printer 150 in accordance with the modified embodiment, a priority is first calculated based on the extracted image component and is then associated with a process condition defining each processing. Therefore, when only a particular relation is extracted from image components in the same image, the priority for the processing corresponding to the relation is assigned, and the priorities for other processing are not assigned. Therefore, a judgment process can be performed more efficiently for trapping, overprint, or any other plate making processing for the image component. It is noted that the priorities may be calculated after a plurality of attributes of each image component pair are determined and then the more frequent attribute is selected.

It is note that the calculation of the priorities is not limited to the foregoing manner. For example, the priorities may be calculated based on color materials. When CMYK is used as color materials, the priorities that define the processing such as trapping or overprint may be calculated based on a predetermined relation among the color materials. For example, black (K) may be given higher priority than the other color materials, and on the contrary, yellow (Y) may be given lower priority than the other color materials.

Alternatively, the image processing apparatus in accordance with the present invention may have a function to learn priorities. More specifically, the judgment results of the process conditions may be stored in a memory one-by-one, and the priority for the next judgment process may be set based on the process condition corresponding to the latest result. In this case, if a similar printing process is performed, a similar process condition is repeatedly applied by priority, thereby minimizing the time required for the judgment process (in other words, only with a single judgment). Accordingly, the load on the determination process in the image processing apparatus can be minimized.

It is noted that, in addition to the image adjustment processing as described above, so-called edge processing may be performed on a single image component, in which an edge is filled and enhanced when the edge is dull due to the effect of a half tone pattern.

<Second Modification>

In the following, a second modified embodiment will be described. An image processing apparatus in accordance with the second modified embodiment differs from the image processing apparatus described above in that it has a function of deciding priorities of process conditions given by the user of the apparatus without contradiction. The function is realized, for example, by giving higher priority to the process condition that is more restrictive.

Figure 8:
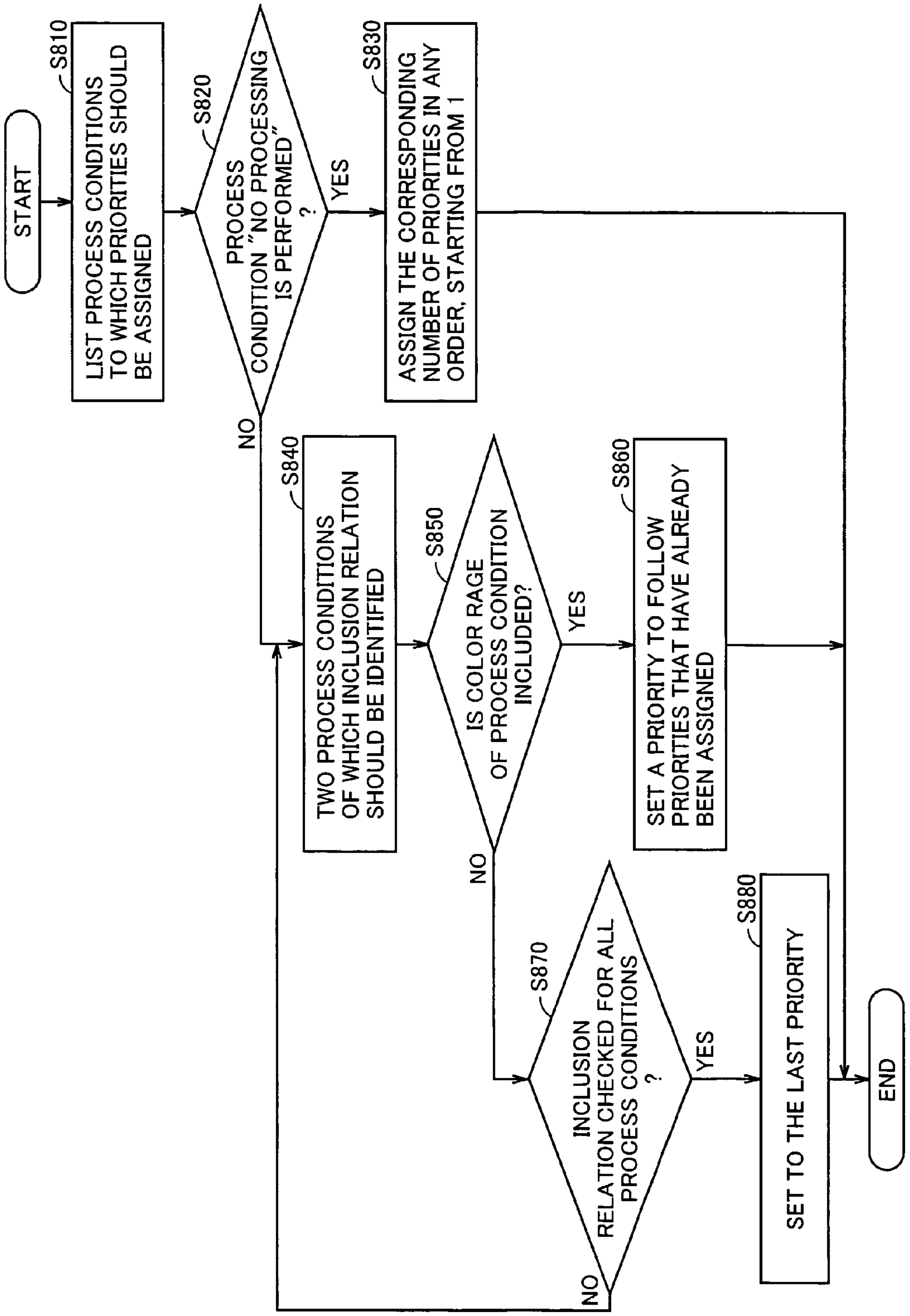
FIG. 8 is a flowchart illustrating the procedure of a process executed by CPU 230 of the printer in accordance with a second modified embodiment of the present invention.

Referring to FIG. 8, the control structure of the image processing apparatus in accordance with this modified embodiment will be described.

At step S810, CPU 230 lists the process conditions to which priorities should be assigned. At step S820, CPU 230 determines whether or not the process condition is such that no processing is performed. If the process condition is such that no processing is performed (YES at step S820), the process move on to step S830. If not (NO at step S820), the process moves on to step S840.

At step S830, CPU 230 sets a priority for each of such process conditions, starting from 1. At step S840, CPU 230 selects two process conditions of which inclusion relation should be identified. At step S850, CPU 230 determines whether or not a color range of a process condition is included. If the color range is included (YES at step S850), the process moves on to step S860. If not (NO at step S850), the process moves on to step S870.

At step S860, CPU 230 sets the priority of the process condition determined that the color range is included at step S850 to follow the priorities that have already been assigned. At step S870, CPU 230 determines whether or not the identification of the inclusion relation is completed for all the process conditions. If the identification of the inclusion relation is completed for all the process conditions (YES at step S870), the process moves on to step S880. If not (NO at step S870), the process returns to step S840. At step S880, CPU 230 sets the last priority for such a process condition.

Here, description will be made to the following two examples, by way of illustration: the process content of "a trapping process" is applied when the process condition is such that "the image component 1 is graphics and the image component 2 is a character"; and the process content of "an overprint process" is applied when the process condition is such that "the image component 1 is graphics and the image component 2 is a black character". In these process conditions, if the priority of the former is higher, the processing of the latter is not applied. In order to prevent such a state, the priorities of the process conditions are set such that the more restrictive condition is basically given higher priority. The reason is as follows.

Specifically, when the process condition is decided, generally, the process condition with an easier condition (the less restrictive process condition) is decided before the process condition with the more restrictive condition is decided. In this instance, for example, a combination of graphics and a character is subjected to a trapping process (referred to as the first processing hereinafter), and in particular, a combination of graphics and a black character is subjected to an overprint process (referred to as the second processing hereinafter). In this instance, the intention of the user can be reflected in the detailed condition setting.

However, if the process condition with an easier condition (not restrictive) is given higher priority, the process condition with a restrictive condition is not selected. For example, when the process condition for executing the first processing is given higher priority, the process condition for executing the second processing is not selected, so that it is likely that the process condition itself becomes meaningless.

Then, the occurrence of the meaningless process condition as described above can be prevented by giving higher priority to the process condition with the restrictive condition beforehand. In the following, it is assumed that six process conditions are provided.

First Process Condition: no processing is performed when the first image component and the second image component are not adjacent to each other.

Second Process Condition: no processing is performed when an overlapping print amount exists between the first image component and the second image component.

Third Process Condition: a trapping process is performed on graphics and a character.

Fourth Process Condition: a trapping process is performed on graphics and graphics.

Fifth Process Condition: an overprint process is performed on graphics and a black character.

Sixth Process Condition: no processing is performed on graphics and a yellow character.

Here, for example, the items for deciding a priority are set as follows.

(1) The process condition "no processing is performed" always takes precedence.

(2) In "the trapping process" and "the overprint process", process conditions are sorted for each attribute of an image component to be subjected to the processing, and the condition with a more restrictive color is given higher priority.

According to such settings, the first, second and sixth process conditions are first given higher priority. The priorities of these three process conditions may be set in any order. Here, the first process condition's priority is "1", the second process condition's priority is "2", and the third process condition's priority is "3" by way of illustration.

Then, a priority is decided for each of the third, fourth and fifth process conditions. The fourth process condition may be given the fourth or subsequent priority, since, based on a combination of attributes, the process condition with the same combination does not exist other than the fourth process condition. In the following, the priority of the fourth process condition is "4" by way of illustration.

As for the third process condition and the fourth process condition, the color ranges of the process conditions are as follows. A numeral value represents the amount of information.

(Third Process Condition)

[Graphics] C (cyan): 0-255, M (magenta): 0-255, Y (yellow): 0-255, K (black): 0-255.

[Character] C (cyan): 0-255, M (magenta): 0-255, Y (yellow): 0-255, K (black): 0-255.

(Fifth Process Condition)

[Graphics] C (cyan): 0-255, M (magenta): 0-255, Y (yellow): 0-255, K (black): 0-255.

[Character] C (cyan): 0-0, M (magenta): 0-0, Y (yellow): 0-0, K (black): 1-255.

Based on each range described above, the third process condition includes the fifth process condition with respect to the magnitude relation of the minimum value and the maximum value of each printing. It is noted that the inclusion relation can be identified based on whether or not the following relation holds.

If the relation of (Cmin of A≦Cmin of B)&(Cmax of B≦Cmax of A)&(Mmin of A≦Mmin of B)&(Mmax of B≦Mmax of A)&(Ymin of A≦Ymin of B)&(Ymax of B≦Ymax of A)&(Kmin of A≦Kmin of B)&(Kmax of B≦Kmax of A) holds, the color range of A includes the color range of B.

In the example above, the fifth process condition is more restrictive, so that the fifth process condition is given the fifth priority, and the third process condition is given the sixth priority. In view of the foregoing, the final priorities are as follows:

the process condition with the priority 1: the first process condition;

the process condition with the priority 2: the second process condition;

the process condition with the priority 3: the sixth process condition;

the process condition with the priority 4: the fourth process condition;

the process condition with the priority 5: the fifth process condition; and the process condition with the priority 6: the third process condition.

It is noted that although in the example described above only the color range is used to decide priorities of process conditions, the manner of deciding priorities is not limited thereto. For example, the process condition may include the size of an image component (for example, width, height, the number of pixels, and the like). In this case, the inclusion relation is identified for the size range, similar to the color range, and a higher priority is given to a more restrictive process condition.

Furthermore, two process conditions are not always in the inclusion relation. In such a case, a priority may be decided according to a process content. For example, when the third process condition is the one for "performing a trapping process on black graphics and character", there is no inclusion relation between the third process condition and the fifth process condition. In this case, it is set that the overprint process precedes the trapping process, so that the priority of the fifth process condition can be higher than the priority of the third process condition.

With the same process content, either process condition may be given higher priority. For example, when the third process condition is such that "the overprint process is performed on a black graphics and character", either of the third process condition and the fifth process condition may take precedence.

In this way, priorities are decided such that the priority of the more restrictive process condition is higher. Therefore, processing can be applied without contradiction even when the user arbitrarily adds a process condition.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus performing image adjustment processing on an image including a plurality of image components having information at least about a color as an attribute, comprising:

a first storage unit storing a process content of said image adjustment processing in association with a process condition for deciding which image adjustment processing is performed, wherein the image adjustment processing includes a plurality of different types of processes;

a determination unit determining whether or not the attribute of said image component satisfies said process condition;

a second storage unit storing a priority of each process condition indicating an order of determination made by said determination unit; and a processing unit successively determining whether or not the attribute of said image component satisfies said process condition based on said priority and executing on said image component said type of image adjustment processing corresponding to said process condition first determined to be satisfied.

2. The image processing apparatus according to claim 1, wherein said determination unit determines whether or not one of one said image component and two said image components satisfies the process condition associated with said priority.

3. The image processing apparatus according to claim 1, wherein a highest priority in said priorities is associated with the process condition for not performing any of said image adjustment processing.

4. The image processing apparatus according to claim 1, further comprising:

a process condition input unit receiving an input of said process condition;

a priority input unit receiving an input of said priority; and an association unit associating received said priority with each said process condition.

5. The image processing apparatus according to claim 1, further comprising a decision unit for deciding each said priority, wherein said decision unit sets a priority of said process condition for not performing said image adjustment processing higher than a priority of said process condition for performing said image adjustment processing.

6. The image processing apparatus according to claim 1, further comprising a decision unit for deciding each said priority, wherein when two said process conditions are in an inclusion relation, said decision unit sets a priority of including said process condition higher than a priority of included said process condition.

7. The image processing apparatus according to claim 1, further comprising:

an image data input unit receiving an input of said image data;

a decision unit for deciding each said priority based on received said image data; and an association unit associating decided each said priority with each said process condition.

8. An image processing method for performing image adjustment processing on an image, in a computer system, including a plurality of image components having information at least about a color as an attribute, the method comprising the steps of:

preparing a process content, in the computer system, of said image adjustment processing in association with a process condition for deciding which image adjustment processing is performed, wherein the image adjustment processing includes a plurality of different types of processes;

determining, in the computer system, whether or not the attribute of said image component satisfies said process condition;

preparing, in the computer system, a priority of each process condition indicating an order of determination made at said step of determining; and successively determining, in the computer system, whether or not the attribute of said image component satisfies said process condition based on said priority and executing on said image component said type of image adjustment processing corresponding to said process condition first determined to be satisfied.

9. The image processing method according to claim 8, wherein at said step of determining whether or not each said image component satisfies the process condition associated with said priority, it is determined whether or not one of one said image component and two said image components satisfies the process condition associated with said priority.

10. The image processing method according to claim 8, wherein a highest priority in said priorities is associated with the process condition for not performing any of said image adjustment processing.

11. The image processing method according to claim 8, further comprising the steps of:

receiving an input of said process condition;

receiving an input of each said priority; and associating received each said priority with each said process condition.

12. The image processing method according to claim 8, further comprising the step of deciding each said priority, wherein at said step of deciding each said priority, a priority of said process condition for not performing said image adjustment processing is set higher than a priority of said process condition for performing said image adjustment processing.

13. The image processing method according to claim 8, further comprising the step of deciding each said priority, wherein at said step of deciding each said priority, when two said process conditions are in an inclusion relation, a priority of including said process condition is set higher than a priority of included said process condition.

14. The image processing method according to claim 8, further comprising the steps of:

receiving an input of said image data;

deciding each said priority based on received said image data; and associating decided each said priority with each said process condition.

15. A recording medium storing a program product for causing a computer to function as an image processing apparatus performing image adjustment processing on an image including a plurality of image components having information at least about a color as an attribute, said program product causing said computer to execute the steps of:

preparing a process content of said image adjustment processing in association with a process condition for deciding which image adjustment processing is performed, wherein the image adjustment processing includes a plurality of different types of processes;

determining whether or not the attribute of said image component satisfies said process condition;

preparing a priority of each process condition indicating an order of determination made at said step of determining; and successively determining whether or not the attribute of said image component satisfies said process condition based on said priority and executing on said image component said type of image adjustment processing corresponding to said process condition first determined to be satisfied.

16. The recording medium according to claim 15, wherein at said step of determining whether or not each said image component satisfies the process condition associated with said priority, it is determined whether or not one of one said image component and two said image components satisfies the process condition associated with said priority.

17. The recording medium according to claim 15, wherein a highest priority in said priorities is associated with the process condition for not performing any of said image adjustment processing.

18. The recording medium according to claim 15, wherein said program product causes said computer to further execute the steps of:

receiving an input of said process condition;

receiving an input of each said priority; and associating received each said priority with each said process condition.

19. The recording medium according to claim 15, wherein said program product causes said computer to further execute the step of deciding each said priority, and at said step of deciding each said priority, a priority of said process condition for not performing said image adjustment processing is set higher than a priority of said process condition for performing said image adjustment processing.

20. The recording medium according to claim 15, wherein said program product causes said computer to further execute the step of deciding each said priority, and at said step of deciding each said priority, when two said process conditions are in an inclusion relation, a priority of including said process condition is set higher than a priority of included said process condition.

21. The recording medium according to claim 15, wherein said program product causes said computer to further execute the steps of:

receiving an input of said image data;

deciding each said priority based on input said image data; and associating decided each said priority with each said process condition.

22. The image processing apparatus according to claim 1, wherein the determination of whether a process condition corresponding to a next priority is satisfied is performed in dependence of a prior process condition not being satisfied.

23. The image processing method according to claim 8, wherein the determination of whether a process condition corresponding to a next priority is satisfied is performed in dependence of a prior process condition not being satisfied.

24. The recording medium according to claim 15, wherein the determination of whether a process condition corresponding to a next priority is satisfied is performed in dependence of a prior process condition not being satisfied.

25. The image processing apparatus according to claim 1, wherein said priority of each process condition is dynamically calculated according to the attribute of the image component.

26. The image processing method according to claim 8, further comprising dynamically calculating the priority based on the image component and subsequently associating a calculated priority with each process condition.

27. The recording medium according to claim 15 wherein said program product causes said computer to further execute the step of:

dynamically calculating the priority based on the image component and subsequently associating a calculated priority with each process condition.

28. The image processing apparatus according to claim 1, wherein said priority is learned based on prior judgment results of the process conditions.

29. The image processing method according to claim 8, wherein said priority is learned, by the computer system, based on prior judgment results of the process conditions.

30. The recording medium according to claim 15, wherein said priority is learned based on prior judgment results of the process conditions.

* * * * *